United States Patent Office 3,062,041
Patented Nov. 6, 1962

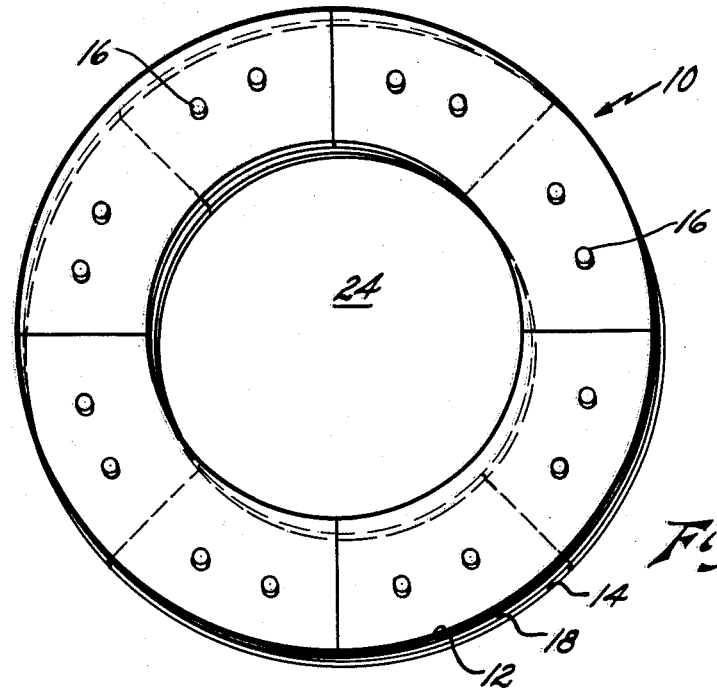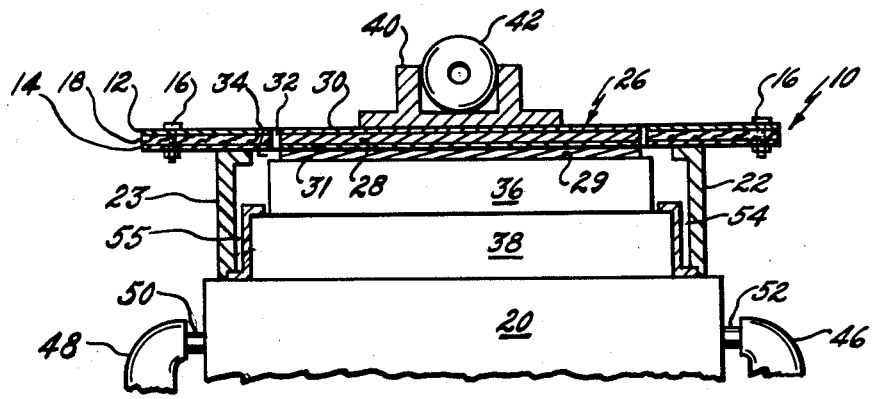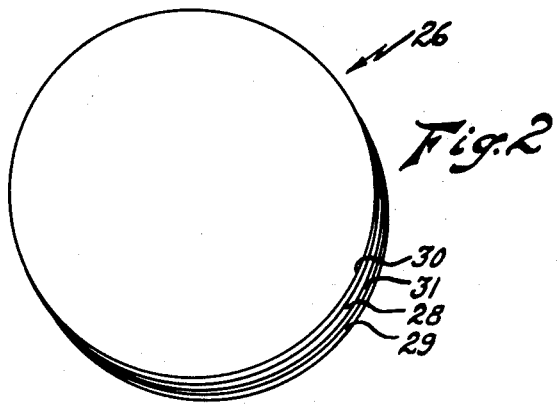

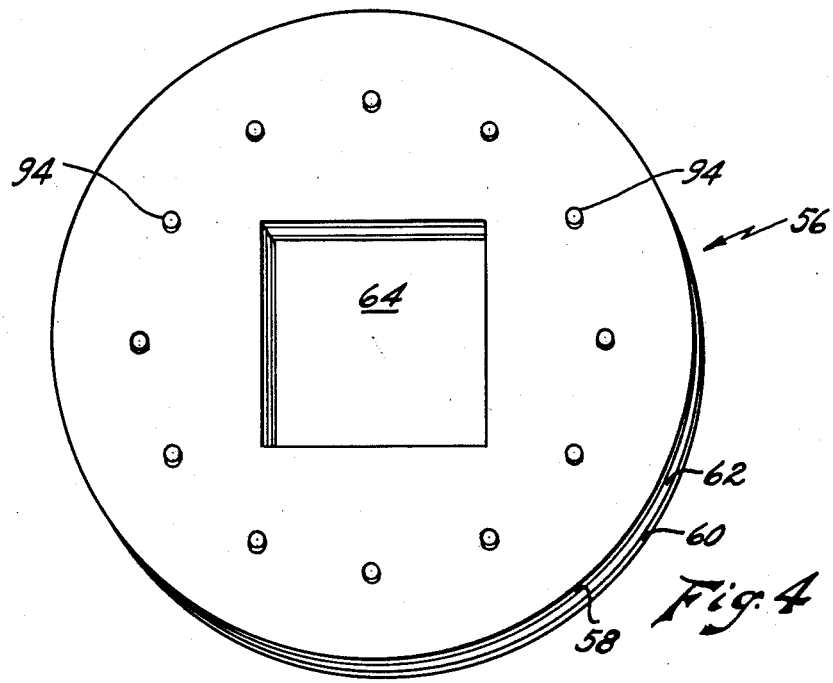
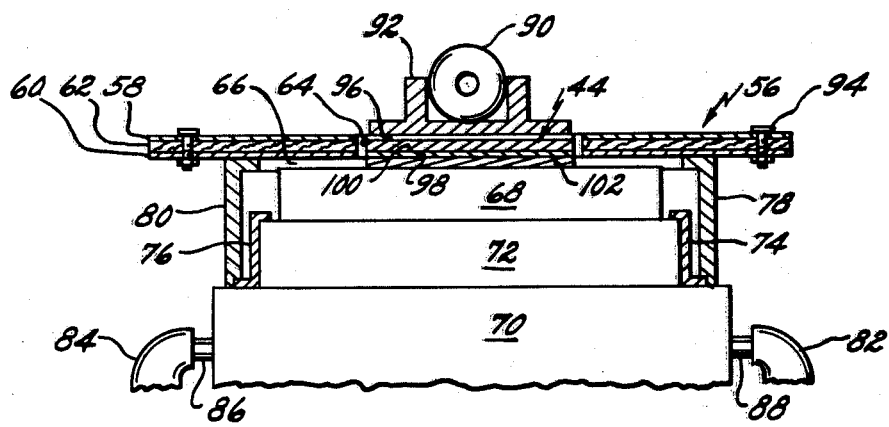
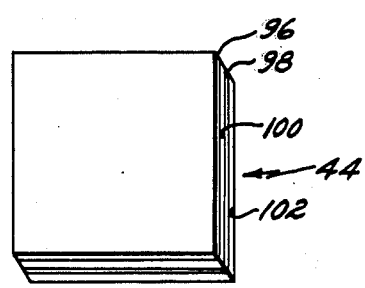

1

3,062,041
DEGAUSSING PLATE ASSEMBLY FOR ELECTRO-
MAGNETIC VIBRATION EXCITER
Walter G. Spodnewski, Schenectady, N.Y., assignor to
the United States of America as represented by the Secretary of the Air Force
Filed May 13, 1960, Ser. No. 29,122
4 Claims. (Cl. 73—71.6)

This invention relates to an electro-magnetic vibration exciter and in particular to a degaussing plate assembly for such an exciter by means of which lower ambient magnetic-flux densities can be achieved in those areas immediately adjacent to a test specimen mounted on the exciter.

A vibrator exciter is a device employed for the purpose of testing the effects of vibration on various types of equipment such as the component parts of an aircraft. Such exciter, in general, comprising a magnetic housing within which are located a stationary field coil suitably connected to a D.C. voltage source and an A.C. current carrying moveable driver coil. The driver coil is situated within an air gap and is interconnected to a driving element which, in turn, is coupled to the exciter test table on which the specimen to be tested is mounted. The D.C. current carrying field coil produces a unidirectional magnetic flux across the air gap and, in conjunction with the A.C. current carrying driver coil situated therein, impart a vibrating or reciprocable motion through the interconnected driving element to the test table.

The high magnetic flux densities created by the exciter pose a problem when testing equipment which is susceptible to magnetic damage. For instance, aircraft fire control equipment especially gyroscopes, are adversely affected by high magnetic field intensities, and, consequently, the ambient magnetic field intensities surrounding a test specimen must be kept below minimum values in order to avoid magnetization of internal parts and permanent damage to the specimen.

The vibration exciters, manufactured heretofore, relied on various arrangements in an attempt to alleviate the aforementioned magnetization problem. For instance, the exciter test table was positioned opposite to and as far away from the driver coil as possible in order to remove the test specimen from the influence of the ambient magnetic field. Another method employed was the use of a degaussing coil positioned between the exciter structure and the exciter test table. However, the problem of adequately reducing the ambient field intensities adjacent to the test specimen has not been successfully solved by the arrangements relied on heretofore. In the prior art vibration devices, referred to above, magnetic field intensities of about 15 to 20 gauss were encountered in those areas immediately adjacent to and surrounding the test specimen, whereas the maximum allowable ambient field intensities for certain aircraft component parts, such as gyroscopes, is about 5 gauss.

It is, accordingly, the principal object of this invention to provide an improved device for reducing the ambient magnetic field intensity produced by an electromagnetic vibration exciter.

Another object of this invention is to provide an improved device for reducing the magnetic flux density adjacent to a sensitive component being subjected to vibration tests by an electromagnetic vibration exciter.

Still another object of this invention is to provide for the utilization of a novel laminated shielding structure which has high magnetic shielding characteristics with minimum weight.

A further object of this invention is to provide for the magnetic shielding of a specimen subjected to vibration testing at various angular orientations.

2

The above and still further objects, features and advantages of this invention will become readily apparent upon an examination of the following detailed explanation thereof and the accompanying drawings, wherein:

FIGURE 1 is an isometric view of the stationary portion of the degaussing plate assembly;

FIGURE 2 is an isometric view of the moveable portion of the degaussing plate assembly;

FIGURE 3 is a side elevational view, partly in section, of the degaussing plate assembly of FIGURES 1 and 2 of this invention attached to a conventional vibration exciter;

FIGURE 4 is an isometric view of an alternative embodiment of the stationary portion of the degaussing plate assembly;

FIGURE 5 is an isometric view of the moveable portion of the degaussing plate assembly to be used with the embodiment shown in FIGURE 4; and FIGURE 6 is a side elevation view, partly in section, of the degaussing plate assembly of FIGURES 4 and 5, affixed to a vibration exciter.

According to the invention, an electromagnetic vibration exciter is provided with a metallic degaussing plate assembly positioned between the exciter test table and the test specimen in such a manner as to effectively reduce the ambient magnetic field intensity surrounding the test specimen. The degaussing assembly consists of an outer stationary assembly of two metallic sheets mounted by means of support legs directly onto the vibration exciter. The central portion of the stationary assembly has an opening within which is positioned a moveable inner "sandwich" assembly of alternate metal plates in such a manner that the "sandwich" is positioned between the exciter test table and the test specimen. The "sandwich" assembly is bolted to the exciter test table and an air clearance of sufficient size separates the outer periphery of the "sandwich" assembly from the inner periphery of the opening in the stationary assembly so that the "sandwich" assembly is freely moveable in conformity with the vibratory motion of the exciter test table. The stationary metalic sheet assembly further consists of a non-magnetic spacer positioned between the two metallic sheets thereby forming a laminated assembly.

The metallic component of the stationary sheet assembly is a high nickel-containing alloy and one alloy found to be particularly effective in reducing the ambient magnetic field intensity is "Mumetal" which contains 76% nickel, 4.5% copper, 1.35% chrome, and 18.15% steel. The alloy is hydrogen heat treated since annealing the alloy provides more effective degaussing. Other high nickel alloys may also be employed as the metallic constituent of the stationary plate assembly such as nickel-iron, nickel-iron-silicon, and nickel-iron-molybdenum alloys. The moveable "sandwich" plate assembly consists of alternate sheets of aluminum and a high nickel-containing alloy similar to the nickel alloy of the stationary sheet assembly. Depending upon the size of the vibration exciter, the outer stationary assembly may consist of alternately spaced unitary sheets of nickel alloy as disclosed in FIGURE 4, or where desired the sheet assembly may consist of segments either bolted or brazed together in an overlapping arrangement as disclosed in FIGURE 1. The moveable assembly and the corresponding opening in the stationary assembly may be either square or round provided the configuration of the stationary assembly is of sufficient size to adequately cover the vibration exciter structure. Plywood is generally employed as the non-magnetic spacer for the stationary sheet assembly because of its weight characteristics; however, other non-magnetic materials such as Bakelite, copper, or aluminum are equally applicable.

The combined effect of the inner and outer plate assemblies of this invention has been found to materially decrease the ambient magnetic field intensities immediately surrounding a test specimen. When employed on a typical vibration exciter, such as the MB Manufacturing Company's Model C-100, the ambient magnetic field intensity was unexpectedly reduced to 0.5 gauss from a normal magnetic field intensity of 15 to 20 gauss, thereby minimizing, to a very great extent, the possibility of magnetizing the internal components of delicate aircraft equipment.

As can best be seen in FIGURES 1, 2 and 3, the first embodiment of the invention comprises a stationary sheet assembly 10 which consists of an annular ring of segmented "Mumetal" sheets 12 and 14, fastened together in an overlapping relationship by means of non-magnetic bolt 16, such as of brass, and a non-magnetic spacer 18, for example of plywood, positioned therebetween. The stationary sheet assembly 10 is affixed to non-magnetic support legs 22 and 23 by means of bolts, not shown. The support legs 22 and 23, generally six in number, are suitably attached to a conventional vibration exciter structure designated as 20 in such a manner that the sheet assembly 10 is rigidly and immoveably affixed to the structure 20. Disposed within the annular opening 24 of the stationary sheet assembly 10 is a circular moveable sheet assembly 26. As is best shown in FIG. 2, the sheet assembly 26 comprises flat metallic sheets of circular structure consisting of alternate aluminum plates 28 and 29 and alternate "Mumetal" plates 30 and 31 in an interleaved relationship. A one-quarter inch air space 32 is maintained between the outer periphery of the stationary sheet assembly 10 and the inner periphery of the moveable sheet assembly 26 along with a clearance 34 between the lower "Mumetal" sheet 14 and the top of the vibration exciter table 36. The air space 32 and clearance 34 must be sufficient so as to allow the moveable assembly 26 to vibrate without interference whenever the vibration exciter is actuated. The air space 32 may be increased to approximately one-half inch, but the larger the gap the greater will be the magnetic flux leakage emanating from the vibration exciter structure 20. Hence, the air space 32 should be kept as small as practicable for minimal magnetic flux leakage while concurrently allowing maximum freedom for the vibration of the moveable assembly 26. The assembly 26 is centrally attached by bolts, not shown, to the exciter table 36 which is fabricated from magnesium. Positioned between the exciter table 36 and the exciter structure 20 is a degaussing coil 38 of conventional design and suitably attached by brackets 54 and 55 to the exciter structure 20. In accordance with teachings of prior art vibration exciters, the degaussing coil 38 aids in minimizing the magnetic damage to test specimens encountered in such prior art devices.

The degaussing plate assembly of this invention may be used with any type of electro-magnetic vibration exciters, however, for maximum effectiveness it is preferred to use an exciter having a degaussing coil, whereby the current ratio of the exciter main D.C. field coil and the degaussing field coil may be adjusted in order to achieve a minimum ambient magnetic field intensity.

A test fixture 40 of suitable design for holding a test specimen 42, for example, the component of an aircraft fire control system, is rigidly affixed by bolts (not shown) to the top of the moveable plate or sheet assembly 26. The vibration exciter 20 is of conventional design and, accordingly, its operation will be described briefly for purposes of clarification only. During exciter operation, the flow of an alternating current through a moveable driver coil, positioned within the vibration structure 20, results in the production of an alternating magnetic flux. The alternating magnetic flux in conjunction with a unidirectional magnetic flux produced across an air gap by a stationary field coil, also situated within the vibration structure 20, imparts a vibratory motion to the driver coil. An interconnection between the driver coil and the vibration exciter table 36 results in the vibratory motion being imparted to the exciter table 36, the moveable sheet assembly 26, the test fixture 40, and the test specimen 42. The structural characteristics of the degaussing plate assembly of this invention and the particular metallic components utilized therein are responsible for adequately reducing the ambient magnetic field intensities immediately surrounding the test specimen 42, by masking or blocking off the magnetic flux intensities emanating from the vibration exciter structure 20. The thickness of the metal sheets used in the degaussing plate assembly or shielding means 10 and 26, their particular areas and specific configuration will, of course, vary according to the size of the vibration exciter structure. For smaller exciter structures, the size of the degaussing plate assembly will be reduced accordingly.

The utilization of the nickel alloy metals in thin layers with a light non-magnetic material interleaved allows for an increase in the shielding effect against the magnetic intensities produced by the vibration exciter structure over that which would be achieved by a single sheet having a thickness equal to the sum of the thicknesses of the layered sheets. The resultant reduction in weight with increased shielding effect reduces the load on the vibration exciter and thereby enables both vertical and horizontal testing.

The particular embodiment disclosed in FIGURES 1, 2, and 3 show the moveable plate assembly positioned so as to substantially cover the entire surface of exciter table 36. This is a preferred embodiment in contradistinction to the embodiment disclosed in FIGURES 4, 5, and 6, to be hereinafter described in greater detail, wherein the moveable plate assembly 44 is positioned so as to cover only the central surface portion of a conventional vibration exciter table. The advantages attributed to the preferred embodiment of FIGURES 1, 2, and 3 reside in the fact that the positioning of the moveable assembly 26 in a manner which covers substantially the entire surface area of exciter table 36 allows for greater versatility in position and methods of attaching test specimen and test fixtures to the exciter table and, also, permits greater reduction of exciter table rocking moment due to off-center location of the combined test specimen—test fixture center of gravity.

The entire vibration exciter structure disclosed in FIG. 3 including the degaussing plate assembly or shielding means 10 and 26 are attached to upright supports 46 and 48 by means of two oppositely disposed trunnions 50 and 52. The positioning of the shielding means 10 and 26 with respect to the vibration exciter 20, in the manner heretofore described, allows for a ninety-degree rotation of the entire structure by means of trunnions 50 and 52 to the horizontal vibration axis position without disturbing the relative alignment of the exciter table 36 and the degaussing plate assembly 10 and 26.

A further embodiment of the degaussing plate assembly of this invention is disclosed in FIGURES 4, 5, and 6. The stationary sheet assembly 56 is similar to sheet assembly 10 except that the "Mumetal" sheets 58 and 60 are of unitary design rather than segmented. The "Mumetal" sheets 58 and 60 are hydrogen heat treated and attached together by brass bolts 94 with a plywood spacer 62 positioned therebetween. The moveable plate assembly 44 is of a square design, as opposed to the circular plate assembly 26 of FIGURE 1, but is similar in all other respects, having alternate "Mumetal" plates 96 and 98 and alternate aluminum plates 100 and 102. Plate assembly 44 is disposed within the square opening 64 of sheet assembly 56 as can best be seen in FIGURE 6. A one-quarter inch air space 64 and an air clearance 66 is maintained in order to allow for the free movement of the moveable plate assembly 44 which is attached by bolts or other suitable means (not shown) to the vibration exciter table 68. Interposed between the exciter table 68 and attached by brackets 74 and 76 to a conventional vibration exciter structure 70 is a degaussing coil 72. The degaussing coil 72 operates to reduce the ambient magnetic flux intensity in the same manner as was heretofore pointed out with respect to the degaussing coil 38 of FIGURE 3.

The stationary assembly 56 is attached to exciter structure 70 by means of aluminum support legs 78 and 80 which, in conjunction with supports 82 and 84 and trunnions 86 and 88, allows for the horizontal vibration of a test specimen without realignment of the exciter table 68 and degaussing plate assembly 44 and 56 in the same manner as explained in conjunction with the degaussing plate assembly 10 and 26 of FIGURES 1, 2, and 3. A test specimen 90 is positioned within a test fixture 92 which, in turn, is suitably attached to the moveable sheet assembly 44. The operation and structural characteristics of the vibration exciter structure 70 is similar in all respects to the vibration exciter structure 20 whose operation was described with some degree of particularity heretofore.

The problem of minimizing the damaging effect of ambient magnetic field intensities often encountered in areas immediately adjacent to sensitive components being vibration tested by electromagnetic vibration exciters has been effectively and unexpectedly solved by the degaussing plate assembly of this invention. In this invention all materials utilized for securing, supporting and spacing are non-magnetic. The particular structural characteristics of the degaussing assembly, its specific positioning, and the materials employed are believed to be responsible for the unique results achieved. However, it should be understood that the present disclosure is for the purpose of illustration only and is not intended to limit the invention, the scope of which is defined by the appended claims.

What I claim is:

1. An apparatus for vibration testing a specimen comprising an electromagnetic vibration exciter having a reciprocating output, a platform arranged to be reciprocated by said output and a magnetic shielding means interposed between said platform, and a specimen to be tested for inhibiting the passage of magnetic energy wherein said shielding means comprises a stationary sheet assembly and a moveable sheet assembly; said stationary sheet assembly being mounted to said vibration exciter and comprising alternate nickel-containing metal sheets, non-magnetic spacing means positioned between said nickel-containing metal sheets, and an opening through said stationary assembly; said moveable sheet assembly being mounted on said platform and disposed within the opening of said stationary sheet assembly in a manner which allows for the free movement thereof, and said moveable sheet assembly comprising alternate nickel-containing metal sheets and interleaved aluminum sheets in a manner which forms a laminated overlay on said platform.

2. The apparatus as defined in claim 1 wherein said laminated overlay is positioned to cover substantially the entire surface area of said platform.

3. An apparatus for vibration testing a specimen comprising an electromagnetic vibration exciter having a reciprocating output, a platform arranged to be reciprocated by said output, a degaussing coil positioned between said platform and said exciter, a magnetic shielding means for inhibiting the passage of magnetic energy affixed to said platform and interposed between said platform and a specimen to be tested, said shielding means comprising a stationary sheet assembly mounted on said vibrator exciter and a moveable sheet assembly mounted on said platform, wherein said stationary sheet assembly is composed of layers of nickel-containing metal plates and at least one layer of a non-magnetic material forming a structure having alternate superposed relationship, said moveable sheet assembly composed of alternate layers of nickel-containing metal plates and aluminum metal plates in a superposed relation; said moveable sheet assembly disposed within an aperture in said stationary sheet assembly such that when said vibrator exciter is at rest the stationary and moveable assemblies are in coplanar relation.

4. The apparatus as defined in claim 3 wherein the plates of said layers comprise a series of segmented sections butted to form single sheets, said sheets having the butted joints staggered when they are superposed.

References Cited in the file of this patent

UNITED STATES PATENTS

| | | |
|---|---|---|
| 2,240,749 | Beechlyn | May 6, 1941 |
| 2,751,512 | Reen et al. | June 19, 1956 |